Sept. 12, 1950     O. E. HOLT ET AL     2,522,117
STRAIN MEASURING INSTRUMENT
Filed April 30, 1945
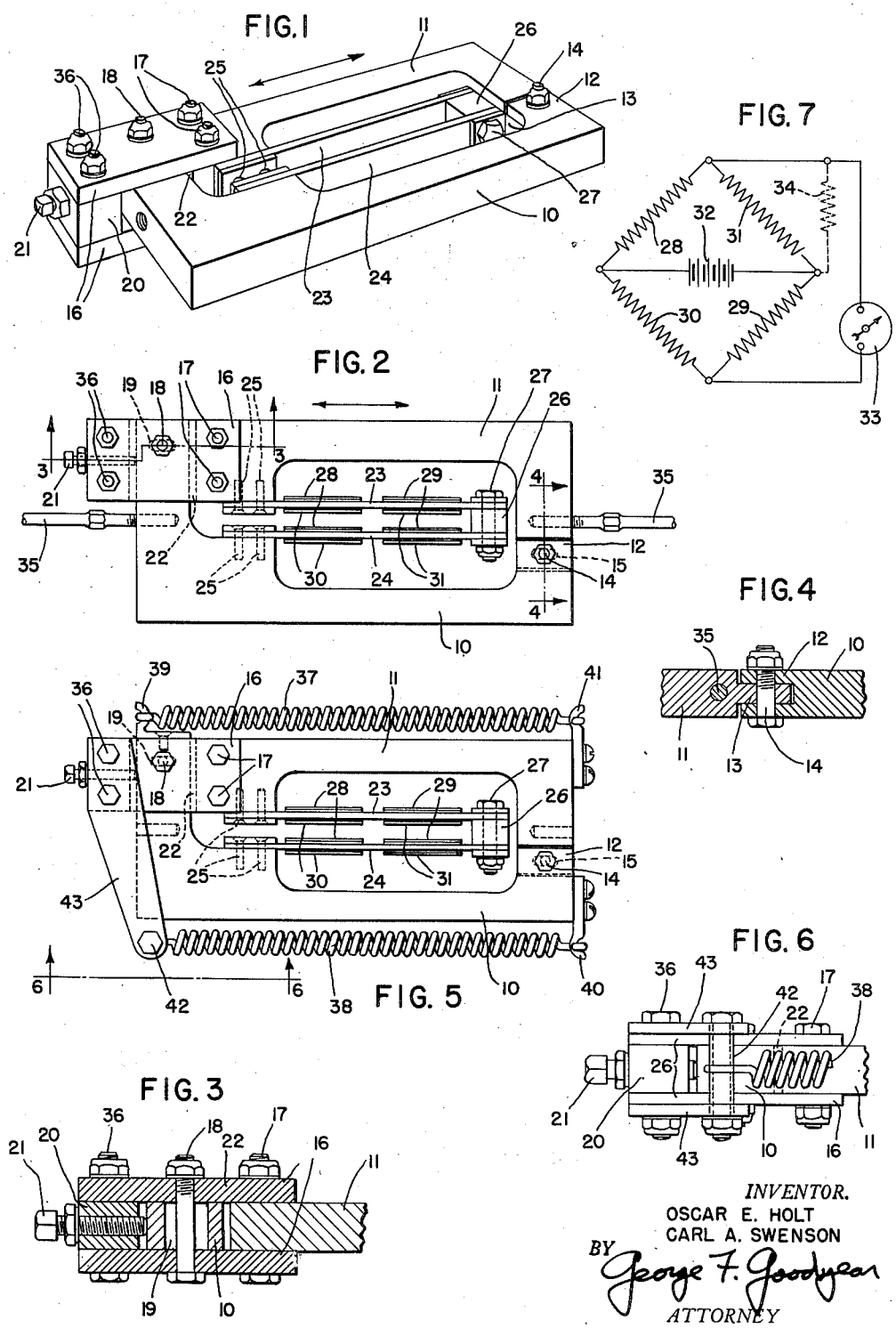
*INVENTOR.*
OSCAR E. HOLT
CARL A. SWENSON
BY George F. Goodyear
*ATTORNEY*

Patented Sept. 12, 1950

2,522,117

UNITED STATES PATENT OFFICE 2,522,117

STRAIN MEASURING INSTRUMENT

Oscar E. Holt, Louisville, Ky., and Carl A. Swenson, Cheektowaga, N. Y., assignors to Curtiss-Wright Corporation, a corporation of Delaware Application April 30, 1945, Serial No. 591,116

2 Claims. (Cl. 73—141)

This invention relates to measuring instruments. More particularly, it relates to instruments for measuring strains and stresses in structural and functional components of machinery, automotive devices, aircraft, stationary structures, or the like.

It is well known to determine loadings and stresses in any particular member of a device or structure by cementing directly to the member specific combinations of strain gages of the type described in Simmons Patent No. 2,292,549. Often the stresses and loadings are very small and necessitate the addition to or rearrangement of the strain gages for the purpose of amplifying the results. However, this is not always possible due to space limitations. Thus, when such a condition exists the results are not as accurate as is usually desired or readings are difficult to comprehend.

It is therefore an object of this invention to provide a device, that, through its flexible design, can accommodate any practical combinations of strain gages to amplify the results into more easily read and more accurate material. Another object of this invention is to provide a device that, through unique features of its structure, will mechanically amplify the results and, when used with a customary amplifying circuit for strain gages, will widen the range of available output for the system. Other objects will appear hereinafter.

The invention may be more easily understood by reference to the accompanying drawings, in which: Figure 1 is a perspective view of one embodiment of the invention, with the strain gages omitted therefrom; Figure 2 is a plan view of the device shown in Figure 1, with strain gages mounted thereon; Figures 3 and 4 are enlarged cross sections taken along the lines 3—3 and 4—4, respectively, of Figure 2; Figure 5 is a plan view of a modified form of construction; Figure 6 is a view taken along the line 6—6 of Figure 5 and Figure 7 is a wiring diagram.

Referring now to the embodiment shown in Figures 1 to 4 inclusive, the instrument comprises two frame members 10 and 11 relatively movable with respect to each other in the direction indicated by the double-ended arrows in Figures 1 and 2. The member 10 is provided with a bifurcated portion 12 in which a cooperating tongue portion 13 on member 11 is adapted to fit. An aligning bolt or pin 14 passes through and is affixed to the bifurcations of portion 12, and at the same time rides in a cooperating slot 15 in tongue portion 13. This slot 15 permits relative movement of members 10 and 11 in the direction indicated, but substantially restricts movement transversely of the slot. At the opposite end of the frame members 10 and 11 an analogous cooperating relationship is provided. A pair of plates 16, carried by and bolted to member 11 by means of bolts 17, carry a bolt 18 affixed thereto and riding in a slot 19 in member 10. This slot 19, like the slot 15, permits relative movement of members 10 and 11 in the direction indicated, but substantially restricts movement transversely of the slot. The two slots and bolts in combination prevent relative rotational movement of the frame members 10 and 11.

Between the outer ends of plates 16 there is bolted, by means of bolts 36, a block 20, in which is positioned a stop screw 21. This stop screw serves to limit relative movement of members 10 and 11 in one direction and to make adjustable the amount of movement desired. The amount of clearance between members 10 and 11 at the point 22 limits movement in the opposite direction.

On interior facing portions of members 10 and 11 are fastened a pair of flexible members or reeds 23 and 24, respectively, by means of screws 25. These flexible members are free to bend in a plane parallel to the direction of relative movement of members 10 and 11 and, in the forms illustrated in the drawings, normal to the axes of the bolts or pins 14 and 18. The flexible members may also expand or contract longitudinally and their resistance to such expansion or contraction may be equal to, greater than or less than their resistance to bending. The flexible members are constrained to move in unison by means of rigid block 26 and bolt 27 holding the opposite ends of the reeds in fixed relationship to each other.

It can be seen that, in the arrangement as described above, and in view of the characteristics of the reeds 23 and 24 as described, any movement of the members 10 and 11 relative to each other will be accompanied by bending of members 23 and 24 and, to a greater or lesser extent, by expansion or contraction of members 23 and 24. Thus, relative movement of member 10 to the right in Figures 1 and 2 will force members 23 and 24 to bend upwards, and member 23 to be stretched slightly and member 24 to be compressed slightly. This is accomplished by reason of the fact that the outer ends of the flexible members are constrained from slipping or otherwise moving relative to each other. The bending can of course be visually observed, while the extension or compression must be observed or recorded by instrumental means, as described herein. There is thus provided an instrument with two alternative methods of observing the results. Visual observation may be assisted, if desired, by means of suitable scales or pointers on the frame members 10 or 11, adjacent the outer ends of members 23 and 24.

To the surfaces of flexible members 23 or 24 or both are adhered one or more resistance type strain gages 28, 29, 30 and 31, such as of the type described in U. S. patent to Simmons No. 2,292,549. As members 23 and 24 expand or contract, the strain gages 28, 29, 30 and 31 expand or contract in unison therewith. The amount or degree of such expansion or contraction may be measured in well-known fashion by incorporation of the strain gage or gages as an arm or arms of a Wheatstone bridge. In the wiring diagram as shown in Figure 7, all four arms of the bridge are incorporated in the instrument, with the gages 28 (connected in parallel) and 29 (connected in parallel) on one side of members 23 and 24 as opposite bridge arms, and gages 30 (connected in parallel) and 31 (connected in parallel) on the opposite side of members 23 and 24 as the remaining arms. It is understood, however, that only a single gage, such as one of the gages 28, need be incorporated in the bridge, in which case the remaining arms are standard resistors. In any case, the Wheatstone bridge is connected in conventional fashion to a power source such as a battery 32 and to a recording or indicating instrument such as a galvanometer 33.

The power source may include an oscillator or other similar source of alternating current, while the output circuit feeding the galvanometer or other indicating or recording equipment, such as an oscillograph, may include amplifiers, rectifiers and the like. The bridge circuit may be normally balanced or normally unbalanced, such as by means of biasing resistor 34, shown in dotted lines. An unbalanced bridge is preferred when an alternating current is used as the power source, so that the direction of force or motion fluctuations can be readily determined.

The instrument may be connected to an object under test by any suitable means such as push-pull rods 35. For example, the severed intermediate ends of a cable, whose tension is to be measured, may be attached to the rods 35.

Referring now to the modified form of the invention shown in Figures 5 and 6, this provides a means of increasing the range of the instrument by reducing the proportionate load on the members 23 and 24. This is accomplished by means of a pair of tension springs 37 and 38 connecting frame members 10 and 11. The springs 37 and 38 are connected by means hooks 39 and 40, respectively, attached to member 10, and hook 41 and pin 42 attached to member 11. Pin 42 is connected to a bifurcated arm 43 which in turn is connected to member 11 through the medium of bolts 36 and plates 16. This arrangement secures an increase of range for both tension loading and compression loading, much the same as though the reeds 23 and 24 were replaced by heavier reeds, but with the advantage that applying and removing springs is much more easily accomplished than changing the reeds. Moreover if the springs 37 and 38 are equal as to initial tension and spring rate, there is no preloading effect because the springs balance each other in the neutral condition of the device. However, if pre-loading is desired it may be achieved by applying only one of the two springs. Thus with only spring 37 installed the device will be preloaded so that the reeds will not reflect tension in rods 35 until such tension exceeds a predetermined value, while with only spring 38 the reeds will not deflect in a direction to show compression of rods 35 until such compression overcomes the pre-loading effect of the spring. By appropriate modification of the spring mountings, compression springs may be substituted for tension springs to secure the desired change in range of the device.

The operation and remaining details of the instrument illustrated in Figures 5 and 6 is otherwise similar to the form shown in Figures 1 to 4 inclusive.

The invention has been described with reference to several specific embodiments thereof. However, it is understood that it is not to be limited except as defined by the appended claims.

We claim:

1. In a strain gage measuring instrument, a pair of substantially rigid elements connected for relative linear displacement, a pair of flexible members arranged in substantially parallel spaced relation to each other and to the line of relative displacement of said elements, said members being secured together in said spaced relationship at one end thereof, one member being secured at its opposite end to one of said elements and the other member being secured at its opposite end to the other of said elements, said members being subjected to bending loads upon the application of linear loads to said elements, and an electrical strain gage adhered to a surface of one member for being strained upon the imposition of such bending loads upon the member.

2. In a strain gage measuring instrument, a pair of substantially rigid elements connected for relative linear displacement, a pair of flexible members arranged in substantially parallel spaced relation to each other and to the line of relative displacement of said elements, said members being secured together in said spaced relationship at one end thereof, one member being secured at its opposite end to one of said elements and the other member being secured at its opposite end to the other of said elements, said members being subjected to bending loads upon the application of linear loads to said elements and at least one pair of electrical strain gages connected in a bridge circuit, the gages of said pair being adhered respectively to different surfaces of said members that are strained differently by such bending loads imposed upon the members.

OSCAR E. HOLT.
CARL A. SWENSON.

REFERENCES CITED

The following references are of record in the file of this patent:

UNITED STATES PATENTS

| Number | Name | Date |
|---|---|---|
| 1,981,153 | Schoof | Nov. 20, 1934 |
| 2,011,931 | Dreyer | Aug. 20, 1935 |
| 2,016,420 | Engst | Oct. 8, 1935 |
| 2,285,580 | Hanson | June 9, 1942 |
| 2,316,975 | Ruge | Apr. 20, 1943 |
| 2,344,642 | Ruge | Mar. 21, 1944 |
| 2,359,245 | Ritzmann | Sept. 26, 1944 |

FOREIGN PATENTS

| Number | Country | Date |
|---|---|---|
| 276,426 | Great Britain | Aug. 26, 1927 |